United States Patent Office 3,591,460
Patented July 6, 1971

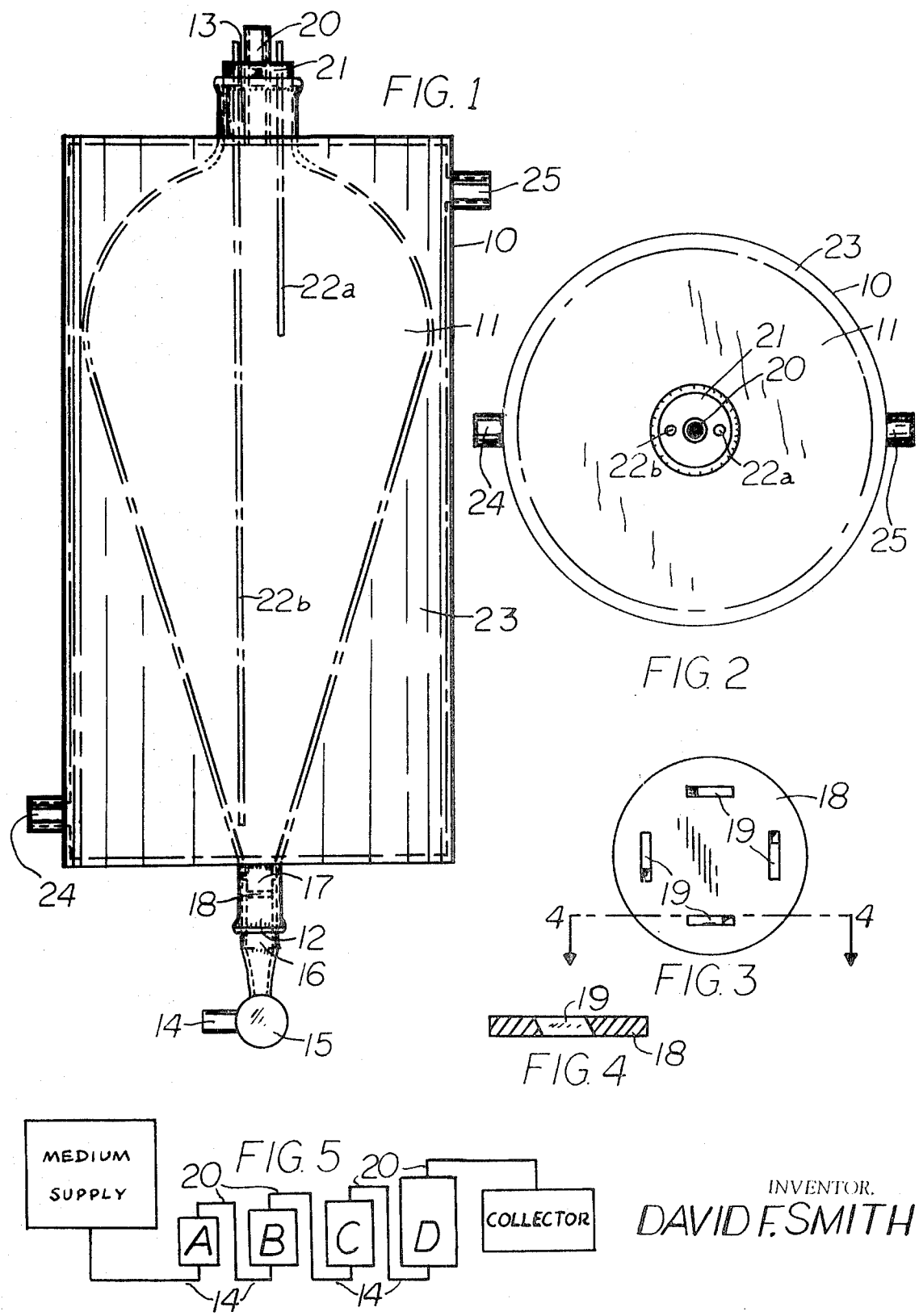

3,591,460
APPARATUS AND MEANS FOR HANDLING CELLS
David F. Smith, 11810 E. 13 Mile Road,
Warren, Mich. 48093
Filed Aug. 30, 1967, Ser. No. 664,322
Int. Cl. C12b *1/10;* C12k *1/10*
U.S. Cl. 195—127                            4 Claims

ABSTRACT OF THE DISCLOSURE

A funnel-shaped chamber apparatus is provided for passage therethrough of upwardly flowing fluid medium adapted for the maintenance and/or growth of living cells in suspension. In use, the medium and the cells are introduced into the chamber and fresh medium is put in at a continuous rate at least sufficient to keep the cells suspended. The living cell population distributes according to size vertically in the chamber (or series of successively larger chambers) and thus can be fractionated for size. Also, bacteria, viruses and other microbiological entities as desired can be continuously cultivated on the living cells for harvesting either intermittently or continuously.

SUMMARY AND DETAILED DESCRIPTION

This invention relates to novel apparatus and means for handling living cells in suspension. More particularly, this invention relates to such apparatus and means which include certain improvements in respect to constancy of cell environment, ease of maintenance and other similar improvements.

Heretofore, cell and tissue culture methods have generally involved the steps of cultivating cell colonies in contact with a dispensed portion of nutrient medium, and from time to time removing the depleted medium and replacing it with fresh medium. [ See, for example, The Tissue Culture Course Staff, An Introduction to Cell and Tissue Culture, page 17, 1955]. The prior art methods have several disadvantages: with passage of time the depletion nutrients becomes undesirably excessive; waste compounds accumulate so that viability and rate of division of the cells decline. Also, exposure of the cells to the medium is non-uniform from cell to cell due to clumping; conventional attempts to equalize the exposure as by stirring and agitation tend to cause cell damage.

It is therefore an object of the present invention to provide apparatus and means for handling a population of living cells in suspension to maximize the probability that any one cell of the population has the same environment as any other cell.

Another object of the invention is to provide apparatus and means for handling living cells in suspension without causing the cell damage associated with the prior art mechanical stirring or agitation.

Still another object of the invention is to provide apparatus and means for handling living cells in suspension in an environment which is truly constant with time.

Yet aother object of the invention is to provide apparatus and means for handling living cells in an environment where the metabolic waste products (and the desired, labile cell metabolic products as they are formed) are continually being removed from the environment.

A further object of the invention is to provide apparatus and means for maintaining the synchronization of a population of living cells.

A still further object of the invention is to provide apparatus and means for fractionating a population of living cells according to size and separately to sample the cells, according to size, if desired, during maintenance, cultivation, etc. without substantial interruption of the cultivation of the population.

Other objects, advantages and features of the invention will be seen from the description which follows in reference to the accompanying drawings in which:

FIG. 1 is a plan view of a preferred embodiment of a cell culture apparatus according to the invention;

FIG. 2 is a view of the top of the apparatus of FIG. 1;

FIG. 3 is an enlarged plan view of the top of an inlet orifice plate;

FIG. 4 is a section of the orifice plate taken on line 4—4 of FIG. 3; and

FIG. 5 is a schematic representation of fractionating apparatus of the invention.

The apparatus of FIG. 1 includes a vessel 10 defining a cone-like chamber 11 with inlet opening 12 and outlet opening 13. The inlet opening 12 connects with a supply line 14 through which fluid medium is delivered to the chamber 11 under pressure from a supply reservoir (not shown). The rate of delivery of the medium to the chamber 11 is controlled by means of an adjustable valve 15. To facilitate cleaning of the apparatus the supply line is removably attached to inlet opening 12 by a socket joint 16. The lower end of the vessel has a constricted throat 17 below which is located an inlet orifice plate 18. The outlet opening 13 at the top of the vessel 11 is fitted with a removeable sealing joint 21. The sealing joint has an overflow line 20 which serves to carry off effluent medium from chamber 11. The effluent can be transferred to a second culture vessel of the kind described, or can be collected, discarded, or a portion mixed with fresh medium and recycled back to supply line 14 as desired. The overflow line 20 is secured to the outlet 13 as part of the sealing joint 21. Joint 21 includes harvest lines 22a and 22b. To provide for constant temperature operation the vessel 10 includes a jacket 23 surrounding chamber 11 with inlet 24 and outlet 25.

To operate the apparatus, fluid medium under pressure (supplied by either gravity flow, pump means or other means) is introduced into the chamber 11 through supply line 14 by way of valve 15 in the open position and through the orifices 19 (FIGS. 3 and 4) into the chamber. A suspension of the cells to be handled is placed in the chamber 11 as by pipetting through the outlet opening 13. Introduction of the medium is continued at a rate sufficient to suspend the cells, the flow rate being adjusted when necessary to keep the cells from settling out at the lower end of the chamber 11. Such settling out is undesirable because it results in packing of cells and consequent death of the cells for lack of exposure to the medium. The medium eventually rises to fill the entire chamber and the overflow passes out through the overflow line 20. The suspension action of the in-flowing medium is enhanced by a preferred type of inlet orifice plate 18 seen in FIGS. 3 and 4. In this preferred embodiment the medium is directed into the chamber by way of opposing slanted channels 19 set off center and oriented in an upward tangential direction to impart a rotational movement to the fluid and its included body of suspended cells located in the lower end or throat of the chamber thereby assuring good cell distribution while avoiding clumping or packing particularly in the lower end of the chamber. In a cell population of mixed sizes and uniform density the cells in accordance with the invention are dynamically distributed upward through the chamber in horizontal layers depending on thier size. At the end point or steady state condition, the largest sizes are located at the lower end, the medium sizes in the middle and the smallest sizes at the maximum diameter of the chamber. The size differential or profile through the height of the cone is gradual, the size being inversely proportional to the square of the diameter of the cone at a given height. Those cells of the population which are smaller than the ones remaining at or below the maximum diameter are carried upward by the fluid flow and pass out of the chamber through the outlet 13. Such out-flowing cells can be held in storage or transferred to other culture vessels for further processing.

During the operation the temperature of the chamber and of its contents is controlled by cycling a cooling or heating liquid through the jacket 23 as required. For example, when handling the fungal species *Blastocladilla emersonii* cells, a temperature of 24° C. is maintained in the jacket; with human cells (Hep-2, Strain 312) the jacket temperature is 37° C. It will be appreciated that the apparatus and its contents are handled aseptically throughout the operation to avoid contamination; seals and gas filters are utilized where required. The system and the materials used are essentially biologically sterile except for the cells themselves. However, as described below, the cells can be maintained in the chamber as a substrate or host for the cultivation of a selected inoculated or implanted bacterium or virus, etc., in which case except for the living cells and inoculum the system is sterile. In other words, the otherwise sterile system in this case supports the growth of a two-membered culture.

The distribution of a range of cell sizes of a population can be achieved according to the invention in a single chamber, as indicated. The invention also contemplates the arrangement where several vessels or chambers of successively larger proportions are arranged in sequence for operation in combination to provide fractionation according to cell size so that the cells collected in each chamber fall within a size range the minimum diameter of which is unique to that chamber, no two chambers having the same size cells once the operation reaches a steady state. The mentioned arrangement is illustrated in FIG. 5. In this embodiment the cell population to be fractionated is introduced into chamber A. The cell medium is then supplied to chamber A and in consequence the cells become suspended and distributed according to size. The relatively small cells which because of their size are not properly within the size range for chamber A are swept out of the chamber and carried over to chamber B. Here the process is repeated but since chamber B is larger than chamber A, a different range of smaller cells is collected. The cells which are too small to be retained in suspension in B are in turn carried over to chamber C, where the process is repeated and then carried over to D in the same fashion. In this manner the entire population of cells can be classified into four separate ranges of consecutively smaller sizes.

For sampling, harvest or retrieval purposes at any stage and as an optional feature, the lines 22a and 22b are provided. Line 22a is located with its open end at the maximum diameter where cells of the smallest size become located, i.e., the height at which the linear flow rate of the ascending medium is the slowest. Line 22b is particularly useful for drawing off any cells which have formed in clumps at the throat of the chamber. Lines 22a and 22b provide convenient aseptic access during the operation; other such lines for access at other points in the chamber can also be provided. The cells and/or extracellular fluid in this way can be drawn off without interfering with the culturing of the cell population. For convenience, the mentioned lines will be referred to hereinafter as "retrieval lines."

The materials employed for the fabrication of the apparatus can be any conventional materials used for fluid flow control and like purposes in the art. Glass, such as hard borosilicate glass, is a preferred material for the chamber 11 since it is inert, durable, transparent, relatively inexpensive, etc., and can be sterilized by ordinary means; plastic materials such as polyethylene or polypropylene, can also be used, such materials having the advantage of economy of manufacture and disposability after a single use without the need for resterilization. The term "funnel shape" as used herein refers to such a chamber which is relatively narrow at its base, is generally symmetrical, and has generally outwardly sloping sides from the lower end to its maximum diameter. The slope of the sides can be discontinuous (and even not necessarily outward at all points). The wall surfaces can be flat or pyramidal so long as the upward flow of the fluid through the chamber is associated with a cross-sectional area which in general increases with increase in height so that the linear flow rate correspondingly diminishes. Chamber shapes which result in localized pockets of stagnation are to be avoided, the object being to achieve uniform upward and decreasing linear flow through the chamber. The capacity of the chamber is not critical. Sizes as low as 125 ml. (maximum diameter, 5 cm.) or lower can be used, but in general the chamber will be from 500–2000 ml. or more in volume, particularly where larger cell populations are required. In this same context, the flow rate of medium through the chamber is subject to considerable variation. In general, the flow rate will be such as to keep the largest cells or cell aggregates of the population from settling out. In the case of human red blood cells, for example, using phosphate buffered saline (PBS) as a medium, the volume rate for a 250 ml. flask [1.0 cm. minimum (i.e., throat) diameter] is 3 ml./min. Other volume rates for the same system with the throat diameter as the only variable correspond linearly with the throat diameter. The applicable flow rate for any system can readily be determined by routine visual observation of the location of the lower margin of the cell population, adjustment being made if necessary so that the lower margin is spaced above the lowest end of the chamber.

Any of a wide variety of cells can be handled in the apparatus of the invention. The term "cell" as used herein applies broadly to any of the non-motile cells originating or derived from multicellular or unicellular plant or animal organisms. For purposes of illustration, the term applies to mammalian cells and cells of fungi, bacteria and algae; some of the numerous species of cells are Circopithecus sp., Saccharomyces sp., *Blastocladiella emersonii*, *Rhizosplyctis rosea*, Chlorella sp., Torella sp., *Escherichia coli*, and *Homo sapiens* (Hep-2, HeLa, etc.).

The medium used in the apparatus in general is any fluid or combination of fluids known to be useful and applicable for the maintenance and/or growth of the type of cells described (as cells per se or as a living host for a selected virus, bacterium or other like entity). The specified cells and media are recognized in the art and their use in cell and tissue culture is well known in accordance with basic considerations (see, for example, An Introduction to Cell and Tissue Culture, supra, for a description of the principles and materials involved). For example, some of the many media which can be used for the purposes of the invention are Cantina's PYC Medium, Basal Salts medium, Eagle's, Medium 199, and Glucase-Machlis' solution. It will be understood that the density of the cells and media used closely approximates unity since the water content is high in any case. If desired, the density of the medium can be increased above the normal value by suitable addition of selected salts, sugars and/or other similar solutes.

According to another embodiment of the invention, the cell population maintained in the chamber can be inoculated with a selected virus, bacterium or other microbiological entity, and the resulting inoculated population maintained further for purposes of propagating the entity. The method is applicable broadly to the propagation of microbiological entities which grow or proliferate on cellular substrates, according to general considerations known to those skilled in the art. For example, some of the numerous entities (with the environmental substrates indicated in parenthesis) which can be propagated according to the invention are para-influenza I, II and III virus (Hep-2), *Dictyostelium discoideum* (*B. subtilis*), and adeno- virus (Canine sp.).

The invention is illustrated by the following example of the maintenance of Hep-2 cells and fractionation thereof into several cell size ranges of the population: Four conical culture vessels (of the type shown in FIG. 1: A, volume, 250 ml./maximum diameter, 6 cm.; B, 500 ml./9 cm.; C, 1000 ml./12 cm.; D, 2,000 ml./15 cm.) are arranged in sequence as shown in FIG. 4 interconnected together aseptically with medium supply and collector vessel. The vessels are jacketed at 37° C. The medium at the same temperature (5 liters; Eagle's, 15% in Tryptose phosphate broth, or equivalent broth, and 10% in calf serum, containing if desired streptomycin, neomycin and/or erythromycin in amount effective for self-sterilization) is metered to vessel A preliminarily supplied with Hep-2 cells, strain No. 318, dispersed in a 25 ml. aliquot containing $4 \times 10^{10}$ Hep-2 cells. The medium is transported through the series of chambers without interruption at the rate of 260 ml. per hour to provide an equilibrium or steady state distribution of suspended cells in the four chambers A, B, C, D. After 4 hours, cell samples from each of the chambers are collected and analyzed electronically in a Coulter counter (Model B Coulter Electronics, Inc., Chicago, Ill.) for determination of mean cell diameter. In comparison with that of the control medium, the mean cell diameter for the population in each of the four chambers, is typically as follows, expressed as "window number":

SAMPLE

Window No.:
- Control _____ 9–10
- A _____ 13
- B _____ 9
- C _____ 8
- D _____ 8

These results are referable to the following scale settings for the counter: reciprocal gain setting, 16; reciprocal aperture current, 0.707 milliampere; scale factor, 6; aperture diameter, 100 microns. These results demonstrate fractionation of the original population into at least 3 discrete cell groups which in size range are different from the original population and from each other. Whereas the foregoing procedure illustrates a case of cell maintenance, it also can be used with slight modification for the growth of the same or other cells as desired. For instance, using only one of the vessels instead of four, the system can be run indefinitely and the cell increase harvested from time to time as required. As indicated above, other cell types and correspondingly appropriate media can be substituted for Hep-2 and the Eagle's plus calf serum. Likewise, the Hep-2 colony maintained as indicated can serve indefinitely as a substrate for the continuous growth of inoculated virus such as parainfluenza virus. In the case of parainfluenza virus production, for example, the effluent medium which constitutes the harvested virus, representing a relatively high virus titer as compared with the batch-wise harvest from a conventional static culture, is chilled to 4° C. and the virus removed by selective adsorption on a column containing iron oxide adsorbent.

While the invention has been described throughout the specification in detail, it will be realized by those skilled in the art that considerable variation in such detail can be made without departing from the spirit of the invention as hereinafter claimed.

I claim:

1. Apparatus for handling living cells in suspension comprising:
   (a) a vessel defining a substantially upright chamber in funnel shape having lower and upper ends, the center of the lower end having a constricted throat and the chamber being adapted as a conduit with progressively increasing cross-sectional area from the lower end upward for ascending passage therethrough of aqueous cell medium;
   (b) supply means for continually introducing fresh medium into the lower end of the chamber at an input flow rate sufficient to cause the medium to rise in the chamber and to hold in suspension cells present in the chamber;
   (c) opening means at the upper end for introducing living cells into the chamber and carrying away medium from the chamber; and
   (d) below the throat interconnecting the supply means and chamber, inlet orifice means comprising channels placed opposite one another and slanted in the same direction to impart an upward rotational movement to cells present in the lower end of the chamber.

2. Apparatus according to claim 1 having temperature control means for the vessel.

3. Apparatus for fractionating living cells according to claim 1 comprising a plural series of said vessels, each successive vessel being larger in maximum diameter whereby fluid transfer through the series at constant volume rate is associated with a decreasing linear flow rate from vessel to vessel.

4. Apparatus according to claim 1 comprising one or more retrieval lines for removal of material from the chamber.

References Cited

UNITED STATES PATENTS

| | | | |
|---|---|---|---|
| 1,510,195 | 9/1924 | Römer | 195—141X |
| 2,758,878 | 8/1956 | Dominick | 137—604 |
| 3,075,888 | 1/1963 | Achorn et al. | 195—127 |
| 3,407,722 | 10/1968 | Huppmann | 99—31UX |
| 3,419,473 | 12/1968 | Dawson | 195—104 |

LOUIS MONACELL, Primary Examiner

G. M. NATH, Assistant Examiner

U.S. Cl. X.R.

195—141